US006368510B2

(12) United States Patent
Friot

(10) Patent No.: US 6,368,510 B2
(45) Date of Patent: Apr. 9, 2002

(54) METHOD AND APPARATUS FOR THE REMOVAL OF ARSENIC FROM WATER

(75) Inventor: Paul H. Friot, Groton, MA (US)

(73) Assignee: Friot Corporation, Ayer, MA (US)

( * ) Notice: Subject to any disclaimer, the term of this patent is extended or adjusted under 35 U.S.C. 154(b) by 0 days.

(21) Appl. No.: 09/161,188

(22) Filed: Sep. 25, 1998

(51) Int. Cl.⁷ .............................................. B01D 15/00
(52) U.S. Cl. ....................... 210/670; 210/673; 210/678; 210/684; 210/739; 210/758; 210/793; 210/138; 210/143; 210/264
(58) Field of Search ................................ 210/670, 673, 210/678, 684, 739, 758, 793, 138, 143, 264, 277, 278

(56) References Cited

U.S. PATENT DOCUMENTS

| 3,554,377 A | 1/1971 | Miller ......................... 210/275 |
| 3,762,550 A | * 10/1973 | Jarr et al. .................... 210/126 |
| 4,622,149 A | 11/1986 | Devuyst et al. ............. 210/717 |
| 5,190,659 A | 3/1993 | Wang et al. ................. 210/663 |
| 5,236,595 A | 8/1993 | Wang et al. ................. 210/669 |
| 5,368,703 A | 11/1994 | Brewster ...................... 204/86 |
| 5,378,370 A | 1/1995 | Brane et al. ................ 210/678 |
| 5,453,201 A | 9/1995 | Etzel et al. .................. 210/668 |
| 5,505,857 A | 4/1996 | Misra et al. ................. 210/709 |
| 5,575,919 A | 11/1996 | Santina ....................... 210/695 |
| 5,591,346 A | 1/1997 | Etzel et al. .................. 210/668 |
| 5,688,378 A | 11/1997 | Khoe et al. .............. 204/157.4 |

OTHER PUBLICATIONS

"Arsenic in Drinking Water," US EPA, downloaded from www.epa.gov on Dec. 8, 1999 (publication date unknown).*
"Arsenic Reduction Systems," Krudico, downloaded from www.krudico.com/arsenic.htm on Dec. 8, 1999 (publication date unknown).*
"Cullsorb Filtration for Iron and Manganese Removal," downloaded from http://www.culligan.ca/ironproc.html on Dec. 8, 1999 (publication date unknown).*
Inversand Company, "Point–of–Use Iron, Manganese, and Hydrogen Sulfide Removal from Well Waters Using Manganese Greensand", *General Notes*, pp. 1–5.
John Magyar, "Kelliher Arsenic Removal Study", Saskatchewan Environment and Public Safety, WQ–149, pp. 1–24, Sep., 1992.
Chubb Michaud, "Arsenic Tightening the standards could spell trouble", *Water Conditioning & Purification*, pp. 80–83, Oct. 1996.
Dr. Robert V. Russo and Thomas J. Shaniuk, "Arsenic Update Regulation & Remediation", *Water Conditioning & Purification*, pp. 84–89, Oct. 1996.
Jim Hunt, "Arsenic Dealer Develops Simple, Reliable Treatment Method Removal", *Water Conditioning & Purification*, pp. 104–107, Oct. 1997.
Sybron Chemicals, Inc., "Strongly Basic Anion, Type II Ion Exchange Resin", *IONAC*, pp. 1–4.

* cited by examiner

Primary Examiner—Chester T. Barry
(74) Attorney, Agent, or Firm—Pearson & Pearson, LLP

(57) ABSTRACT

A method and apparatus for removing arsenic from water at point of entry or point of use particularly for residential application. The point of entry system comprises a first stage having a manganese greensand oxidizer to convert arsenite (As+3) present in the water to arsenate (As+5) and a second stage for passing the water through an anion exchange resin. Each stage includes a control head for automatic regeneration at a predetermined frequency. The manganese greensand is regenerated with a solution of potassium permanganate and the anion exchange resin is regenerated with a salt solution. An alternate embodiment for point of use application comprises a manganese greensand oxidizer cartridge to convert arsenite (As+3) to arsenate (As+5) followed by removal of the arsenate (As+5) with a reverse osmosis system.

25 Claims, 3 Drawing Sheets

METHOD AND APPARATUS FOR THE REMOVAL OF ARSENIC FROM WATER

BACKGROUND OF THE INVENTION

1. Field of the Invention

This invention relates to a method and apparatus for removing arsenic from drinking water and in particular to removing arsenite (As+3) and arsenate (As+5) from a water system at a point of entry or point of use by first converting arsenite (As+3) to arsenate (As+5) and then removing the arsenate.

2. Description of Related Art

Arsenic is a naturally occurring substance found in a variety of combined forms in the earth. Arsenic is a Group 5A nonmetal with the more common valences of −3, 0, +3 and +5. Arsenite (As+3) and arsenate (As+5) are the most common forms found in drinking water and waste water streams. The United States Environmental Protection Agency maximum contaminant level (MCL) for arsenic is 50 parts per billion (ppb). The World Health Organization's (WHO) standard MCL for arsenic is 10 ppb.

The United States Environmental Protection Agency (EPA) has stated that arsenic in drinking water causes cancer in humans and that the amount of arsenic in water at the current allowed concentration may equal that caused by smoking cigarettes. There are negotiations to reduce the current maximum concentration limit of 50 ppb to as low as 10 ppb. Therefore, water providers have a need for an economical safe method to remove arsenic from drinking water. Further, residential homes obtaining water from wells have a need for a low cost, safe, and efficient point of entry or point of use arsenic removal system.

Technologies which have been used for removal of arsenic include the following: (1) adsorption onto activated alumina within a fixed bed contactor; (2) complexing arsenic with hydrous metallic floc, previously aluminum and iron hydroxides or oxyhydroxides, in conventional water treatment plants; (3) sieving the metal from water by membrane technologies such as reverse osmosis; and (4) electrodynamic processes such as electrodialysis.

However, most technologies for arsenic removal are plagued by the basic difficulty of removing arsenite (As+3). The more successful techniques are ones that have been used on large municipal supplies, but they are not practical for residential application because of space requirements, the use of dangerous chemicals, frequent monitoring and expense. The two most common techniques for residential water correction have been reverse osmosis (RO) and activated alumina. Activated alumina requires the use of caustic chemicals and a very large volume for the high flow rates available with this invention. RO is no longer certified as an arsenic removal technique because of its inability to reduce arsenite (As+3) significantly.

U.S. Pat. No. 5,368,703 issued Nov. 29, 1994 to Michael D. Brewster describes a process and apparatus for removing arsenic from wastewater. The process comprises the steps of providing a bipolar electrochemical cell 10 comprising a pair of outer electrode elements, passing the wastewater through the cell 10 while applying an electric potential across the electrodes so that the anode and cathode are oppositely charged, positive and negative, producing anodically ferrous ion in the form of an insoluble iron compound, specie, or complex in the ionizing media, and subjecting the media containing the iron compound specie or complex to a mild oxidation sufficient to convert the ferrous ion present therein to ferric ion and to oxidize the arsenic therein to +5 valence specie to form ferric arsenate and an hydroxy ferric oxide-arsenate complex which are insoluble and removable from the media in a clarifier. However, this method is incumbered by the need for an electrochemical cell, multiple chemical feed pumps, the addition of chemicals requiring precision monitoring and necessitating storage and repressurization of the water.

U.S. Pat. No. 5,575,919 issued Nov. 19, 1996 to Peter F. Santina describes a method and system for removing toxic substances from drinking water such as arsenic by the use of finely divided metallic iron in the presence of powdered elemental sulfur or other sulfur components such as manganese sulfide followed by an oxidation step to effect arsenic recovery as a precipitate which is separated from the water. However, this method requires a mixing vessel, the creation and use of sulfur modified iron, and the addition of acid as well as other chemicals requiring precision monitoring.

U.S. Pat. No. 5,591,346 issued Jan. 7, 1997 describes a water or wastewater purification process for reducing selenium and arsenic concentrations in contaminated water by the use of a cation exchange resin. Contacting the contaminated water stream with an iron (III)—complexed cation exchange resin in an ion exchange column forms an acid exchangeable iron III arsenate complex immobilized on the cation exchange resin and in effluent stream having reduce arsenic concentration. However, this method is incumbered by the need for a chemical feed pump to inject an oxidizing agent, the addition of an acid to regenerate the resin and the addition of deionized water for rinsing of the resin.

In the above three patents each system requires highly skilled personnel for operation and maintenance on an ongoing basis. Therefore they are not suitable for residential use at point of entry.

SUMMARY OF THE INVENTION

Accordingly it is therefore an object of this invention to provide a method and apparatus for removing arsenic from water including arsenite (As+3) and arsenate (As+5).

It is another object of the invention to remove arsenic from water by pre-oxidizing the arsenic to convert arsenite (As+3) to arsenate (As+5).

It is a further object of this invention to provide an arsenic removal system that is suitable in cost, space required, and efficiency for residential environment or commercial application.

It is yet another object of this invention to reduce the concentration of arsenic in drinking water to below 10 ppb and in some applications to a nondetectable level.

These and other objects are further accomplished by a system for removing arsenic from water comprising means connected to the water for converting arsenite in the water to arsenate, and means connected to the arsenite converting means for removing arsenate in the water. The arsenite converting means comprises manganese greensand. The system comprises a solution of potassium permanganate for regenerating the manganese greensand. The arsenite converting means comprises means for controlling the frequency of regenerating the manganese greensand. The means for removing arsenate from the water comprises an anion exchange resin bed. The system comprises a salt solution for regenerating the anion exchange resin bed. The arsenate removing means comprises means for controlling the frequency of regenerating the anion exchange resin bed. The system comprises a plurality of valve means for allowing the water to flow to a user bypassing the arsenic removing system. In an alternate embodiment the means for removing the arsenate comprises a reverse osmosis system.

The objects are further accomplished by a system for removing arsenic from water comprising a first control unit connected to the water, a container of manganese greensand connected to the first control unit for converting arsenite to arsenate as the water passes through the manganese greensand, a container connected to the control unit for supplying potassium permanganate to the manganese greensand for regenerating the manganese greensand, a second control unit connected to the first control unit for passing the water from the manganese greensand container through an anion exchange resin bed for removing arsenate from the water, and a salt tank connected to the second control unit for regenerating the anion exchange resin by passing a salt solution through the anion exchange resin. Each of the first control unit and the second control unit determines the time of regeneration of the manganese greensand and the anion exchange resin respectively. The system comprises a plurality of valve means for allowing the water to flow to a user bypassing the arsenic removing system.

The objects are further accomplished by a method of removing arsenic from water comprising the steps of providing means for converting arsenite in the water to arsenate, and providing means connected to the arsenite converting means for removing arsenate from the water. The method comprises the steps of providing first control means for regenerating the arsenite converting means and second control means for regenerating the arsenate removing means. The step of providing first control means and second control means comprises the step of providing timer means in each of the first control means and the second control means for determining when regeneration occurs. The step of providing means for converting arsenite to arsenate comprises the step of flowing the water through manganese greensand. The step of removing arsenate comprises the step of providing an anion exchange resin bed for the water from said arsenite converting means to flow through. The step of regenerating the arsenite converting means comprises the step of passing potassium permanganate through the manganese greensand. The step of regenerating the arsenate removing means comprises the step of passing a salt solution through the anion exchange resin bed. In an alternate embodiment, the step of removing arsenate comprises the step of providing a reverse osmosis means for removing arsenate from the water from said arsenite converting means.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
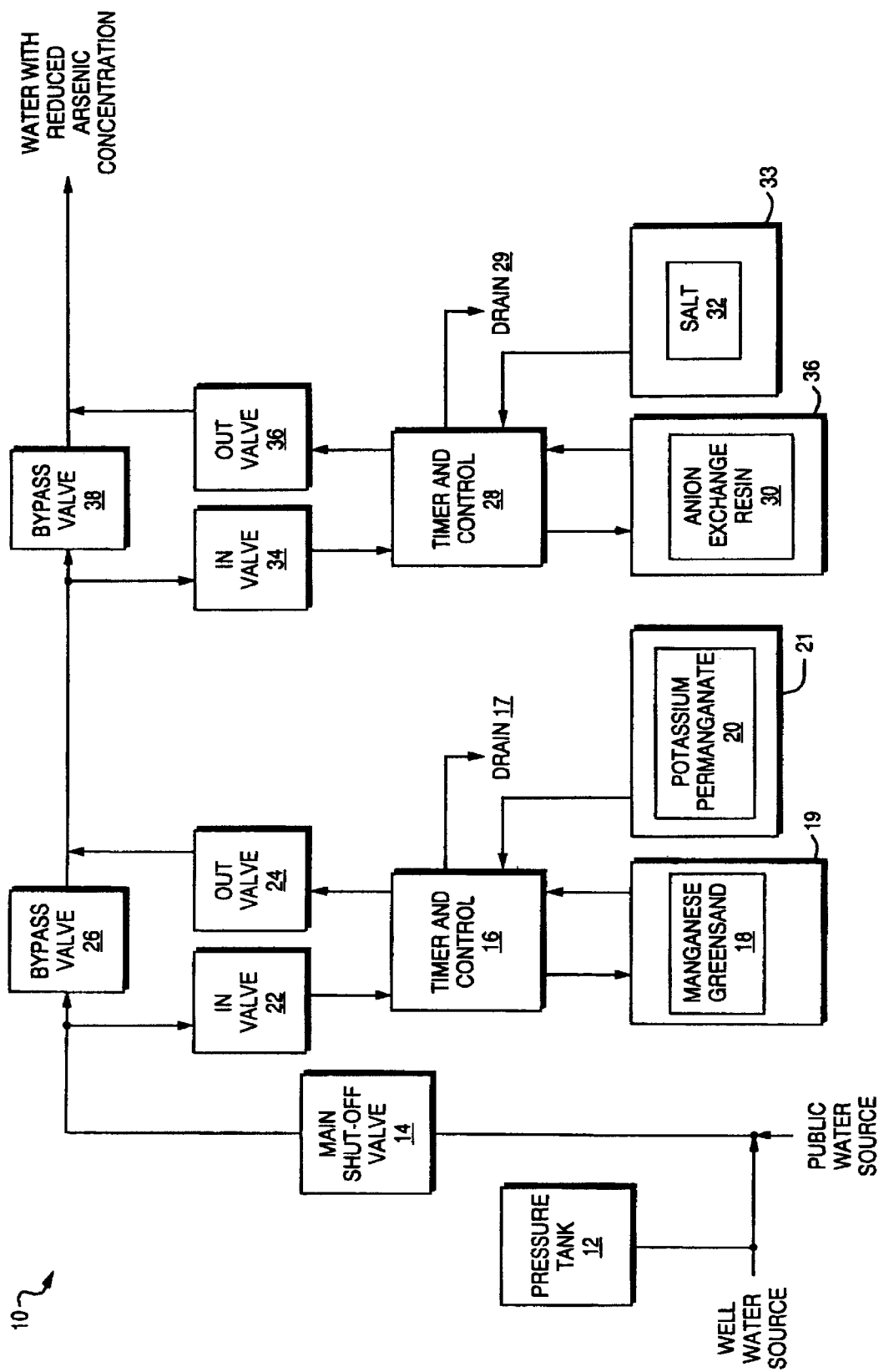
FIG. 1 is a block diagram of the preferred embodiment of the present invention for reducing the concentration of arsenic in water at a point of entry.

Referring to FIG. 1. a block diagram of the invention is shown for removing arsenic (As) from water. This invention is particularly optimized for residential application, but is equally applicable for commercial use. FIG. 1 shows a system 10 for removing arsenic from a well water source or from a public water supply where the user flow rates are typically 5–10 GPM through the system 10. Where the source of water is from a well, a pressure tank 12 is required. No pressure tank is generally required when the water is from a public water system.

The most common forms of arsenic found in drinking water or waste water streams are arsenite (As+3) and arsenate (As+5). The important feature of this system is that arsenite (As+3) is first converted to arsenate (As+5) and then the arsenate (As+5) is removed from the water. This method is very efficient, cost effective and safe for residential application. In particular, there are no chemicals requiring precision monitoring, and the chemicals used are commonly used in residential equipment.

Still referring to FIG. 1, the conversion of arsenite (As+3) to arsenate (As+5) and removal from the water is accomplished in two stages. In the first stage water with the arsenic passes through a tank 19 comprising manganese greensand 18. A timer and control unit 16 is attached to the top of the tank 19 comprising the manganese greensand 18 to control flows during the conversion process and also during a process of regeneration of the manganese greensand 18 using potassium permanganate 20. A tank 21 comprising the Potassium Permanganate is coupled to the timer and control 16 allowing flow in either direction. One of ordinary skill in the art will recognize that the lines with arrows, such as shown in FIG. 1, represent the flow of water through the system 10 using a suitable conduit.

The timer and control unit 16 controls four steps in the regeneration process for the manganese greensand 18. First, the timer and control 16 initiates a backwash causing water to flow into the bottom of the tank 19 comprising manganese greensand 18 and up through the manganese greensand 18 and out drain 17; second, the timer and control 16 sucks the potassium permanganate 20 out of its tank 21, flushes it through the manganese greensand 18, and then a slow rinse is performed; third, a fast rinse of the manganese greensand 18 occurs to purge it of the potassium permanganate 20; and fourth, the timer and control 16 causes fresh water to be put back into the potassium permanganate 20 container or tank 21. During regeneration there is a no raw water bypass which precludes the untreated raw water (with arsenic) from being drawn by a user. This regeneration process occurs typically on a weekly basis.

Still referring to FIG. 1 the second stage performs the removal of arsenate (As+5) from the water. The water flows through an anion exchange resin 30 in a tank 31 via a timer and control unit 28 which controls flow during arsenate (As+5) removal from the water and controls regeneration of the anion exchange resin 30. After the water passes through the anion exchange resin 30 for the arsenate (As+5) removal, it is directed by the timer and control unit 28 out of the system 10 for general use.

The regeneration of the anion exchange resin 30 is determined by the timer and control unit 28 which controls four steps. First the timer and control 28 initiates a backwash causing water to flow into the bottom of the anion exchange resin 30 and up through the resin 30 and out drain 29; second, the timer and control 28 sucks a salt solution out of its container or tank 33, flushes it through the ion exchange resin 30, and then a slow rinse is performed; third, a fast rinse of the resin 30 occurs to purge it of the salt 32; and fourth, the timer and control 28 causes fresh water to be put back into the salt tank 33. During regeneration there is a no raw water bypass which precludes the untreated raw water (with arsenic) from being drawn by a user. The salt may be sodium chloride or other suitable salt product. Regeneration typically occurs on a weekly basis.

The point of entry, arsenic removal system 10 can be bypassed so that the user can always draw water. Closing In Valve 22, Out Valve 24, In Valve 34 and Out Valve 36 and opening Bypass Valve 26 and Bypass Valve 28 accomplishes the removal of system 10. Therefore, maintenance activities or a problem with the system 10 do not prevent a user from drawing untreated water.

Figure 2:
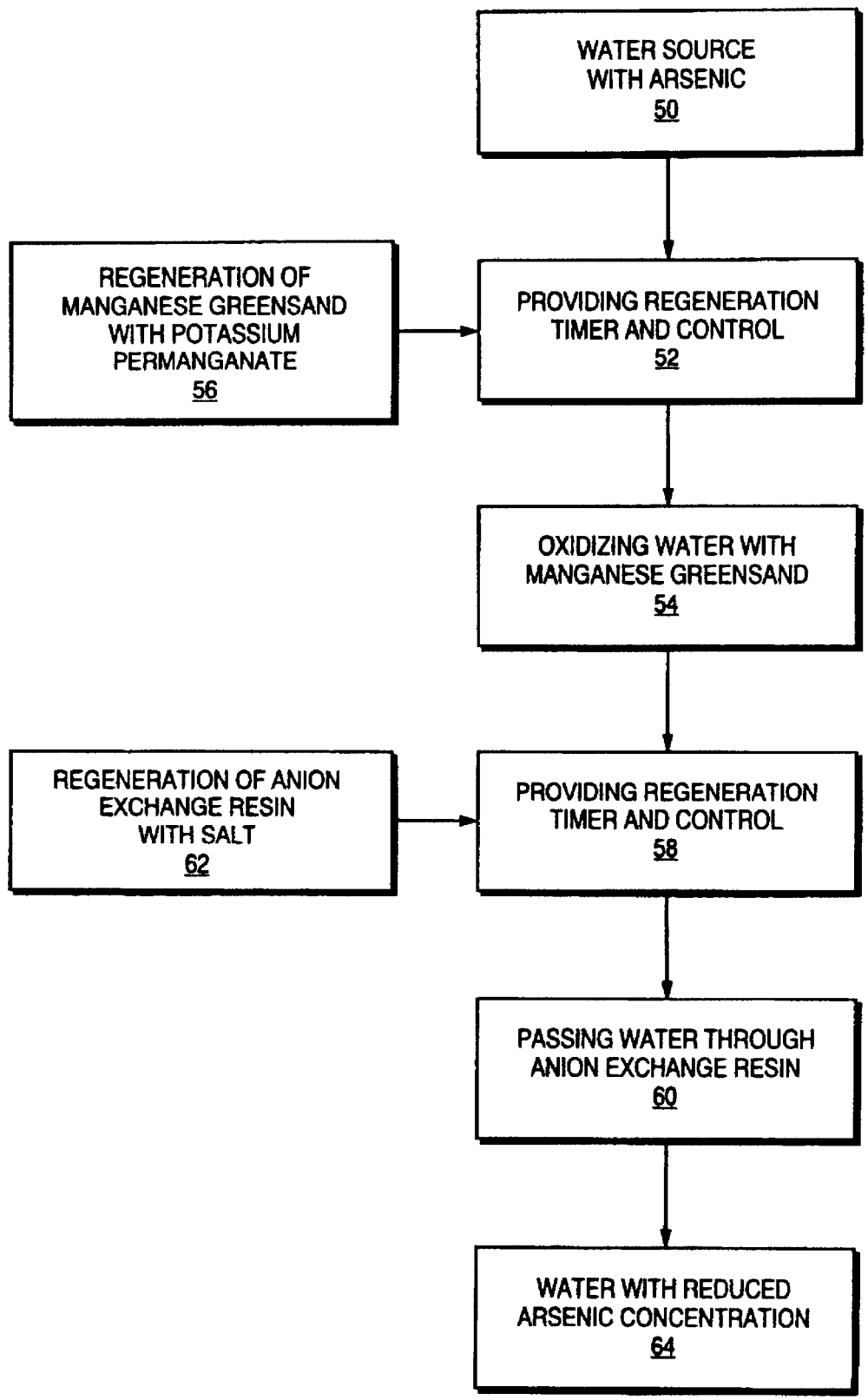
FIG. 2 is a flow chart of the method of removing arsenic from water.

Referring now to FIG. 2 a flow chart is shown of the two stage method of removing arsenic from water using system 10. The method comprises the step 52 of passing the water through a timer and control unit 16, and step 54 provides for oxidizing the water with manganese greensand 18 for converting the arsenite (As+3) to arsenate (As+5). In the next step 58 water passes through another timer and control unit 28, and in step 60 the water passes through the anion exchange resin 30 where arsenate (As+5) is removed resulting in water having an arsenic concentration below 10 ppb and in some cases nondetectable. Step 56 provides for the regeneration of the manganese greensand 18 with potassium permanganate 20 which is controlled by the timer and control unit of step 52. Step 62 provides for the regeneration of the anion exchange resin 30 with a salt solution which is controlled by timer and control 58.

Referring again to FIG. 1, the manganese greensand 18 may be embodied by Model 1054 greensand medium (1.5 cubic feet) sold by Inversand Company of Clayton, New Jersey. The timer and control 16 may be embodied by a Model 2500 manufactured by Fleck Controls, Inc. of Brookfield, Wis. with the following characteristic: (1) backwash rate of 7 GPM, (2) Brine refill rate of 0.5 GPM and (3) a no raw water bypass piston. The potassium permanganate may be embodied by a 10"×16" permanganate tank 21 with a grid and a float safety manufactured by Clack Corporation of Windsor, Wis.

Further, the anion exchange resin 30 may be embodied by a Model 1054 anion resin system manufactured by Sybron Chemicals, Inc. of Birmingham, N.J. including 1.5 cu.ft. of anion resin Model A-554. The timer and control unit 28 may be embodied by a Model 2500 control head manufactured by Fleck Controls, Inc. of Brookfield, Wis. having the following features: (1) backwash rate of 1.2 GPM; (2) brine refill rate of 0.5 GPM; (3) brine draw rate of 0.26 GPM; and (4) a no raw water bypass piston. The salt tank 33 is 18"×33" with a grid and a float safety.

Experimental test results in a residential environment from the point of entry system 10 have indicated that with the arsenic level in the raw water at 211 ppb, the arsenic level in the intermediate water at the output of the first stage (between the manganese greensand 18 and the anion exchange resin 30) is measured at 204 ppb, and the arsenic level in the treated water at the output of system 10 is measured to be less than 6 ppb (which is the testing laboratory detection limit).

Figure 3:
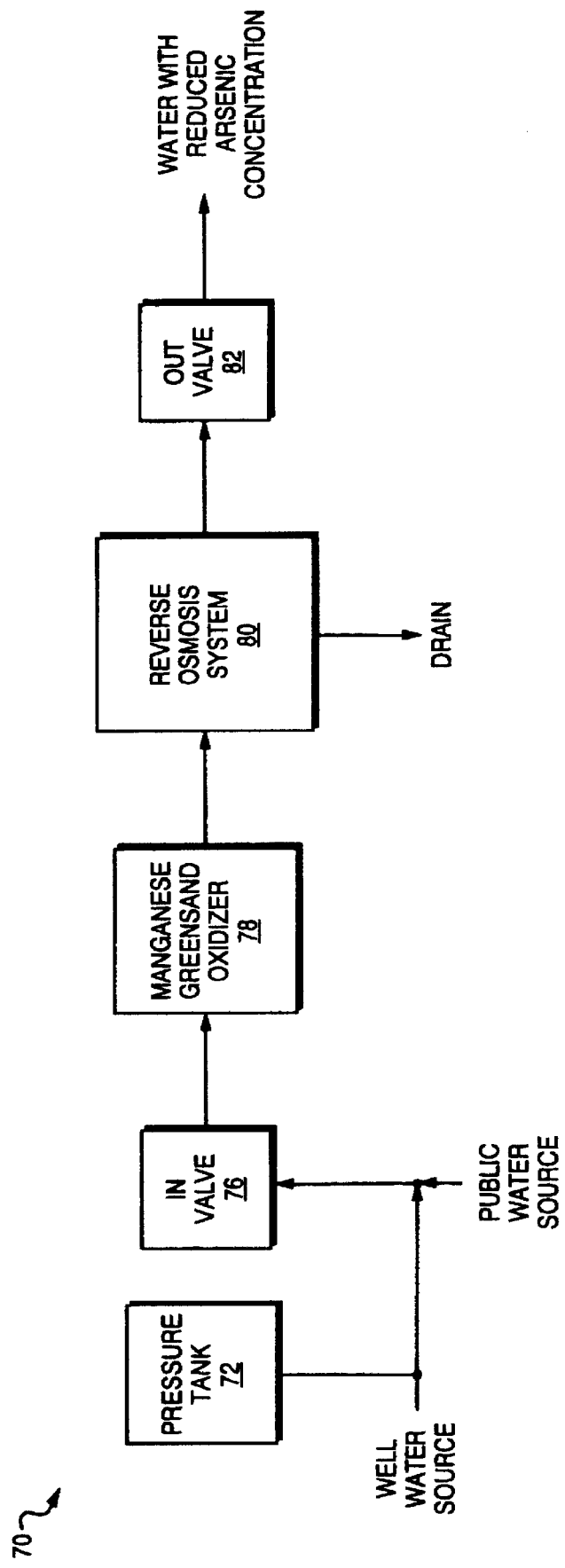
FIG. 3 is a block diagram of an alternate embodiment of the present invention for reducing the concentration of arsenic in water at a point of use.

Referring now to FIG. 3. an alternate embodiment is shown of a point of use system 70 for removing arsenic from water. This embodiment is useful for point of use application having low flow rates by a user such as 14–20 gallons per day. As stated previously a pressure tank 72 is generally only required when the water source is from a well.

In this process water passes through a manganese greensand oxidizer 78 which converts arsenite (As+3) to arsenate (As+5). The water then passes into a reverse osmosis (RO) system 80 which removes the arsenate (As+5). The reverse osmosis system 80 may be embodied by Model N4000 TFCM SO manufactured by CUNO/Water Factory System of Meriden, Connecticut. The Model N4000 comprises a space for a prefilter so the manganese greensand oxidizer 78 may be inserted within the Model N4000 RO package. RO systems have been known to reduce arsenate (As+5) by 90% but typically arsenite (As+3) is reduced by only 50 to 60% In system 70, the total arsenic is reduced to below 10 ppb and in some cases the arsenic nondetectable.

Experimental test results in a residential environment for the point of use system 70 have indicated that with the arsenic level in the raw water at 70 ppb, the arsenic level in the treated water at the output of system 70 is less than 5 ppb (which is the detection limit of an alternate testing laboratory). Without the manganese greensand oxidizer 78 connected in the system 70, thereby feeding the raw water with 70 ppb of arsenic directly into the reverse osmosis system 80, the treated water output arsenic level is measured at 40 ppb.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A system for removing arsenic from a water source over a continuous period of time comprising:
    means connected to said water source for converting arsenite in said water source to arsenate;
    means connected to said arsenite converting means for removing arsenate in said water flowing from said arsenite converting means; and
    said water flowing from said arsenate removing means comprises an arsenic concentration level of about 10 parts per billion or less.

2. The system as recited in claim 1 wherein said arsenite converting means comprises manganese greensand.

3. The system as recited in claim 2 wherein said system comprises a solution of potassium permanganate for regenerating said manganese greensand.

4. The system as recited in claim 3 wherein said arsenite converting means comprises means for controlling the frequency of regenerating said manganese greensand.

5. The system as recited in claim 1 wherein said means for removing arsenate from said water comprises an anion exchange resin bed.

6. The system as recited in claim 5 wherein said system comprises a salt solution for regenerating said anion exchange resin bed.

7. The system as recited in claim 6 wherein said arsenate removing means comprises means for controlling the frequency of regenerating said anion exchange resin bed.

8. The system as recited in claim 1 wherein said system comprises a plurality of valve means for allowing said water to flow to a user bypassing said arsenic removing system.

9. The system as recited in claim 1 wherein said means for removing said arsenate comprises a reverse osmosis system.

10. A system for removing arsenic from water over a continuous period of time comprising:

a first control unit connected to said water;

a container of manganese greensand connected to said first control unit for converting arsenite to arsenate as said water passes through said manganese greensand;

a container connected to said control unit for supplying potassium permanganate to said manganese greensand for regenerating said manganese greensand;

a second control unit connected to said first control unit for passing said water from said manganese greensand container through an anion exchange resin bed for removing arsenate from said water;

a salt tank connected to said second control unit for regenerating said anion exchange resin by passing a salt solution through said anion exchange resin; and said water flowing from said arsenate removing means comprises an arsenic concentration level of about 10 parts per billion or less.

11. The system as recited in claim 10 wherein each of said first control unit and said second control unit determines the time of regeneration of said manganese greensand and said anion exchange resin respectively.

12. The system as recited in claim 10 wherein said system comprises a plurality of valve means for allowing said water to flow to a user bypassing said arsenic removing system.

13. A system for removing arsenic from a source of water over a continuous period of time comprising:

a container of manganese greensand connected to said water source, said manganese greensand converting arsenite in said water source to arsenate;

a container of anion exchange resin arranged to receive a first water output from said manganese greensand container, said anion exchange resin removing arsenate from said first water output; and a second water output flowing from said container of anion exchange resin comprises an arsenic concentration level of about 10 parts per billion or less.

14. The system as recited in claim 13 wherein said system comprises a solution of potassium permanganate for regenerating said manganese greensand.

15. The system as recited in claim 14 wherein said system comprises means for controlling the frequency of regenerating said manganese greensand.

16. The system as recited in claim 13 wherein said system comprises a salt solution for regenerating said anion exchange resin bed.

17. The system as recited in claim 16 wherein said system comprises means for controlling the frequency of regenerating said anion exchange resin.

18. A method of removing arsenic from a water source over a continuous period of time comprising the steps of:

providing means for converting arsenite in said water source to arsenate; and providing means, connected to said arsenite converting means, for removing arsenate from said water flowing from said arsenite converting means, said water flowing from said arsenate removing means comprises an arsenic concentration of about 10 parts per billion or less.

19. The method as recited in claim 18 wherein said method comprises the steps of providing first control means for regenerating said arsenite converting means and second control means for regenerating said arsenate removing means.

20. The method as recited in claim 19 wherein said step of providing first control means and second control means comprises the step of providing timer means in each of said first control means and said second control means for determining when regeneration occurs.

21. The method as recited in claim 19 wherein said step of providing means for converting arsenite to arsenate comprises the step of flowing said water source through manganese greensand.

22. The method as recited in claim 21 wherein said step of regenerating said arsenite converting means comprises the step of passing potassium permanganate through said manganese greensand.

23. The method as recited in claim 19 wherein said step of removing arsenate comprises the step of providing an anion exchange resin bed for said water from said arsenite converting means to flow through.

24. The method as recited in claim 23 wherein said step of regenerating said arsenate removing means comprises the step of passing a salt solution through said anion exchange resin bed.

25. The method as recited in claim 18 wherein said step of removing arsenate comprises the step of providing a reverse osmosis means for removing arsenate from said water from said arsenite converting means.

* * * * *